US009128222B1

(12) United States Patent
Linblad et al.

(10) Patent No.: US 9,128,222 B1
(45) Date of Patent: Sep. 8, 2015

(54) LED LIGHTING APPARATUS

(71) Applicant: AUTOMATED ASSEMBLY CORPORATION, Lakeville, MN (US)

(72) Inventors: Scott Linblad, Lakeville, MN (US); Matthew Odden, Lakeland, MN (US)

(73) Assignee: Automated Assembly Corporation, Lakeville, MN (US)

( * ) Notice: Subject to any disclaimer, the term of this patent is extended or adjusted under 35 U.S.C. 154(b) by 48 days.

(21) Appl. No.: 13/945,004

(22) Filed: Jul. 18, 2013

(51) Int. Cl.
*F21V 8/00* (2006.01)
*H01L 33/52* (2010.01)

(52) U.S. Cl.
CPC ............ *G02B 6/0025* (2013.01); *G02B 6/0031* (2013.01); *H01L 33/52* (2013.01)

(58) Field of Classification Search
CPC .. G02B 6/0001; G02B 6/0011; G02B 6/0016; G02B 6/0021; G02B 6/0036; G02B 6/0038; G02B 6/0081; G02B 6/0083; G02B 6/0025; G02B 6/0031; H01L 33/52
See application file for complete search history.

(56) References Cited

U.S. PATENT DOCUMENTS

| | | | | |
|---|---|---|---|---|
| 4,714,983 | A * | 12/1987 | Lang | 362/27 |
| 5,842,297 | A * | 12/1998 | Tung | 40/546 |
| 5,950,340 | A * | 9/1999 | Woo | 40/564 |
| 7,108,414 | B2 * | 9/2006 | McCollum et al. | 362/604 |
| 7,717,605 | B2 * | 5/2010 | Shibata | 362/630 |
| 7,850,358 | B2 * | 12/2010 | Hamada | 362/612 |
| 8,864,357 | B2 * | 10/2014 | Kim | 362/608 |
| 2004/0130019 | A1* | 7/2004 | Chen | 257/723 |
| 2008/0101084 | A1* | 5/2008 | Hsu | 362/612 |
| 2012/0170317 | A1* | 7/2012 | Tsai et al. | 362/621 |
| 2012/0287371 | A1* | 11/2012 | Oura | 349/60 |
| 2012/0300495 | A1* | 11/2012 | Kim et al. | 362/606 |

\* cited by examiner

*Primary Examiner* — Bao Q Truong
(74) *Attorney, Agent, or Firm* — Crawford Maunu PLLC

(57) ABSTRACT

A lighting apparatus includes a light-diffusive plate having opposing faces bounded by one or more sides. The plate has disruptions on a first face of the opposing faces and a first channel along at least a portion of a first side of the one or more sides. A first cover has first and second surfaces disposed over the first channel with the first surface facing the first side of the light-diffusive plate. A plurality of light-emitting diodes (LEDs) is disposed on the first surface of the first cover and within the first channel. The LEDs electrically coupled with wiring are integrated with the first cover.

24 Claims, 4 Drawing Sheets

LED LIGHTING APPARATUS

FIELD OF THE INVENTION

The embodiments of the present invention generally relate to an LED apparatus.

BACKGROUND

LED-based lighting is becoming more popular due in part to the energy efficient qualities and durability of LEDs. One popular application is advertising and public information signage. In some implementations, LEDs are placed along one or more edges of a light-transmitting panel, and the light-transmitting panel is configured to evenly emit light from the LEDs through a surface of the panel.

With an edge-lit light-transmitting panel, light from the LEDs is spread evenly through the panel by total internal reflection. Disruptions formed on the surface of the panel scatter incident light so that light is emitted from the surface of the panel.

SUMMARY

In one embodiment, a lighting apparatus includes a light-diffusive plate having opposing faces bounded by one or more sides. The light-diffusive plate has a plurality of disruptions on a first face of the opposing faces and a first channel along at least a portion of a first side of the one or more sides. A first cover has first and second surfaces and is disposed over the first channel with the first surface of the cover facing the first side of the light-diffusive plate. A plurality of light-emitting diodes (LEDs) is disposed on the first surface of the first cover and within the first channel. The LEDs are electrically coupled with wiring integrated with the first cover.

A method of making a lighting apparatus is provided in another embodiment. The method includes forming disruptions on a first face of opposing faces of a light-diffusive plate. The opposing faces of the light-diffusive plate are bounded by one or more sides. A first channel is formed along at least a portion of a first side of the one or more sides. A plurality of light-emitting diodes (LEDs) is attached on a first surface of a first cover, and the first cover is attached to the light-diffusive plate over the first channel such that the plurality of LEDs are disposed in the channel.

In another embodiment, a lighting apparatus includes a light-diffusive plate having opposing faces bounded by one or more sides. The light-diffusive plate has disruptions on a first face of the opposing faces and a first channel along at least a portion of a first side of the one or more sides. A first cover includes a polyimide substrate, and the polyimide substrate has a first surface and a second surface. The first cover is disposed over the first channel with the first surface of the polyimide substrate facing the first side of the light-diffusive plate. A plurality of light-emitting diodes (LEDs) is disposed on the first surface of the polyimide substrate and within the first channel. The LEDs are electrically coupled with wiring integrated with the polyimide substrate. At least one positive connector lead and at least one negative connector lead are disposed on the second surface of the polyimide substrate. The at least one positive connector lead is electrically coupled to a positive power line of the LEDs, and the at least one negative connector lead is electrically coupled to a negative power line of the LEDs. An ultra-violet (UV) curable encapsulant fills the first channel.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

This disclosure describes an LED lighting apparatus that provides efficient dissipation of heat from the LEDs and that is adaptable for various applications, including signage or general lighting. The LED lighting apparatus may be adapted for use in outdoor applications which require protection against weather elements. Since the LEDs are embedded in the light-diffusive plate rather than supported by a frame outside the plate, the lighting apparatus can be deployed and adapted for particular functional and aesthetic requirements.

The lighting apparatus includes a light-diffusive plate. The plate has opposing faces and sides that surround the opposing faces. The intersections between the faces and the sides of the plate are the edges of the plate. The plate has at least one channel that extends along at least a portion of at least one of the sides of the plate. A number of LEDs, which are electrically connected, are disposed in the channel. The electrical connections may include only power lines or both power and control lines.

Figure 1:
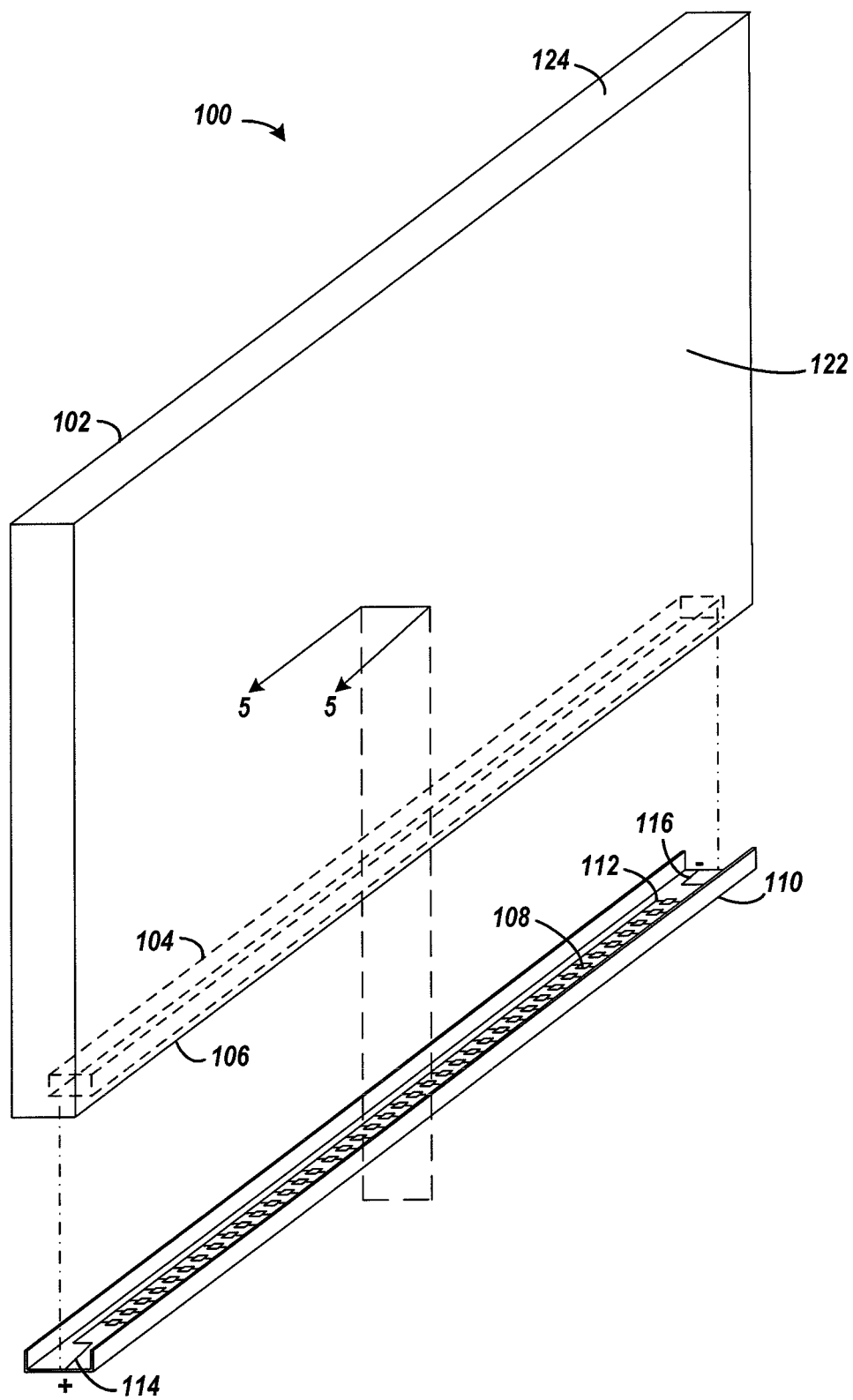
FIG. 1 shows a perspective view of a lighting apparatus.

FIG. 1 shows a perspective view of the lighting apparatus 100. The lighting apparatus includes light-diffusive plate 102 having a channel 104 formed on side 106. The channel forms a recess large enough to accommodate the string of LEDs 108. The LEDs are mounted on channel cover 110, and the channel cover is disposed over the channel 104 such that the LEDs are within the channel.

The channel cover includes a metal coated dielectric in an example implementation. In a particular implementation, the cover may include an aluminum-coated polyimide substrate. In other implementations, the channel cover may be a rigid printed circuit board rather than flexible. Also, the cover may include multiple dielectric and/or conductive layers. Conductive traces 112 are disposed on and integrated with the polyimide substrate, which insulates the traces from the aluminum coating. The aluminum coating effectively dissipates heat emitted from the LEDs when the lighting apparatus is operated. A circuit-side surface of the metal-coated polyimide substrate has the LEDs mounted thereon and faces the channel 104. The metal-coated surface of the metal-coated polyimide substrate faces away from the channel.

In one implementation, the channel cover may be shaped to wrap around edges of the side having the channel as shown. Alternatively, the width or breadth of the channel cover may be slightly larger than the channel such that the channel is fully covered when the channel cover is disposed on the side having the channel. The conductive traces include power lines 114 and 116 and may also include control lines (not shown).

In one implementation, the light-diffusive plate is made from a transparent thermoplastic such as polymethyl methacrylate (PMMA or "acrylic glass"). In an example implementation, the light-diffusive plate is rectangular as shown. Other implementations may call for different shapes such as other polygons, or circular, elliptical, or irregular shapes.

Though not shown in FIG. 1, the light-diffusive plate has disruptions formed on one face 122 of the opposing faces of the plate. With an edge-lit lighting apparatus, light from the LEDs is spread evenly through the light-diffusive plate by total internal reflection. The disruptions formed on the surface of the plate scatter incident light so that light is emitted from the face of the plate having the disruptions. Another implementation has disruptions formed on both face 122 and the opposing face (not shown) of the light-diffusive plate.

The arrangement of LEDs in the channel may be varied according to implementation requirements. For example, different implementations may call for different sizes, numbers, and/or spacing of LEDs. Also, there may be more than one row of LEDs disposed in the channel. Another implementation may have more than one channel formed on the light-diffusive plate. For example, in addition to channel 104, another channel (e.g., channel 464 in FIG. 5) may be formed along side 124, and another channel cover (e.g., channel 466 in FIG. 5) with LEDs (e.g., LED 468 in FIG. 5) may be disposed over the channel. Other implementations may have multiple channels on a single side of the light-diffusive plate.

Figure 2:
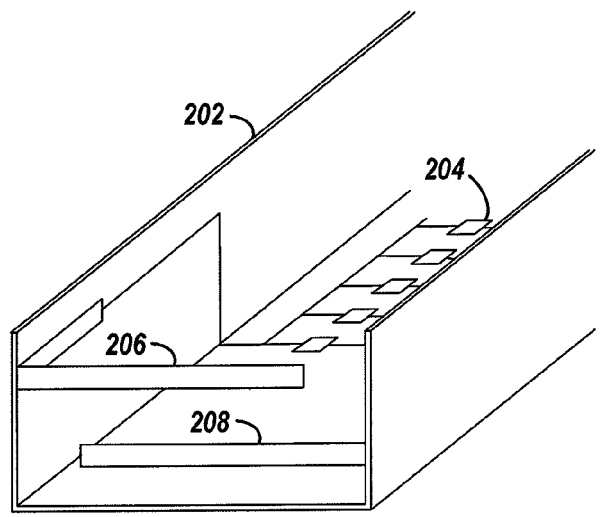
FIG. 2 shows an example implementation of connector leads on the channel cover for electrically connecting the string of LEDs to a power source.

FIG. 2 shows an example implementation of connector leads on the channel cover for electrically connecting the string of LEDs to a power source. A portion of a channel cover 202 is shown with a partial string of LEDs 204. Metallic connector leads 206 and 208 are attached to the channel cover and connected to the positive and negative power lines of the LED string. It will be appreciated that additional connector leads may be similarly provided for connecting the LED string to control signal lines.

The connector leads may be an aluminum or copper foil and may be attached to the channel cover and connected to the power lines with a conductive adhesive or by a solder attachment. The connector leads may be bent as shown to conform to the edge of the light-diffusive plate (not shown), which may be useful for insertion of the completed lighting apparatus into a socket (not shown) for providing power.

Figure 3:
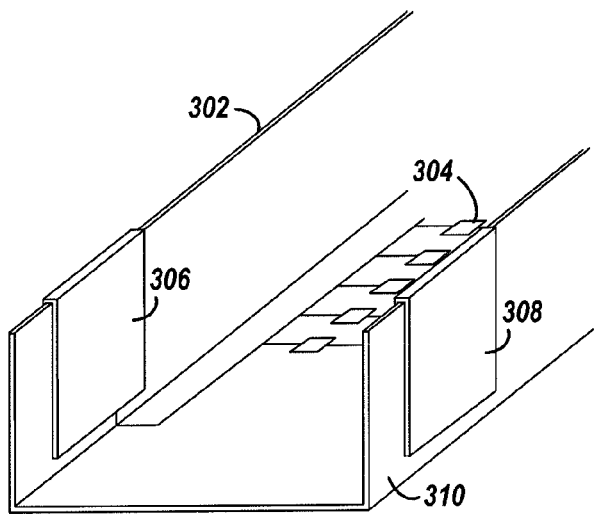
FIG. 3 shows another example implementation of connector leads on the channel cover for electrically connecting the string of LEDs to a power source.

FIG. 3 shows another example implementation of connector leads on the channel cover for electrically connecting the string of LEDs to a power source. A portion of a channel cover 302 is shown with a partial string of LEDs 304. Metallic connector leads 306 and 308 are attached to the channel cover and connected to the positive and negative power lines of the LED string. It will be appreciated that additional connector leads may be similarly provided for connecting the LED string to control signal lines.

The connector leads may be an aluminum or copper foil and may be attached to the channel cover and connected to the power lines with a conductive adhesive or by a solder attachment. The connector leads may be bent as shown to wrap from one surface of the channel cover, around the edge, to the other surface of the channel cover, which may be useful for insertion of the completed lighting apparatus into a socket (not shown) for providing power. Though not shown, it will be appreciated that connector lead 306 includes a portion that is disposed on the surface of the channel cover 302 that is opposite the surface of the channel cover that faces the light-diffusive plate. In other words, connector lead 306 has a portion that is similar to the portion of connector lead 308 that is shown in the diagram. Similarly, connector lead 308 includes a portion (not shown) that is similar to the portion of connector lead 306 shown in the diagram. Since channel cover 302 is metal coated, an insulator (not shown) may be disposed between the connector lead and the metal coated surface 310 of the channel cover.

Figure 4:
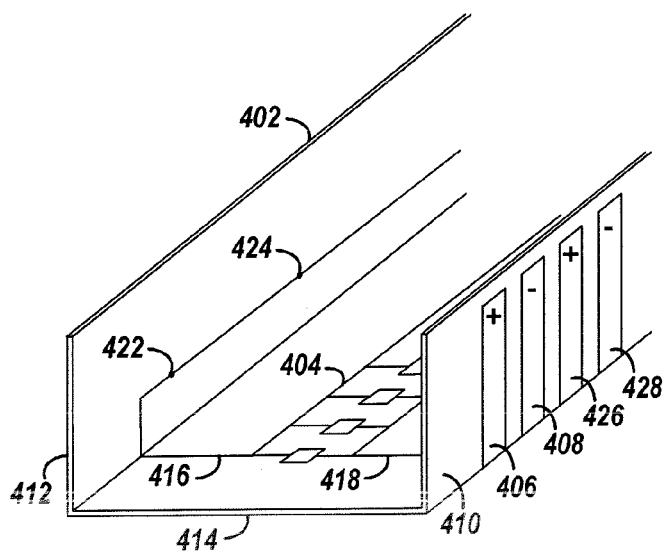
FIG. 4 shows another example implementation of connector leads on the channel cover for electrically connecting the string of LEDs to a power source.

FIG. 4 shows another example implementation of connector leads on the channel cover for electrically connecting the string of LEDs to a power source. A portion of a channel cover 402 is shown with a partial string of LEDs 404.

The structure of FIG. 4 differs from the structures of FIGS. 2 and 3 in that the polyimide substrate is not metal-coated. Instead, metallic connector leads, for example leads 406 and 408, are provided in a circuit layer on the side of the substrate opposite the side on which the LED string is disposed. The connector leads may be copper, for example.

The connector leads are disposed in an alternating pattern of positive and negative connections to the string of LEDs. Connector lead 406 extends from one wall 410 of the channel cover to the other wall 412 of the channel cover. In the perspective view, the connector leads are not visible on wall 412 and base 414 of the channel cover. All of the positive and negative connector leads may be disposed in this manner.

The connector leads are electrically connected to the positive and negative power lines 416 and 418 by vias. For example, via 422 connects connector lead 406 to the positive power line 416, and via 424 connects connector lead 426 to the positive power line 416. The connector leads 408 and 428 are similarly connected to the negative power line 418 by vias which are not visible in the perspective view. The alternating pattern provides a number of choices for connecting power lines 416 and 418 to an external power source. The connections can be made at any of the connector leads, with solder joints for example. In addition, the number and size of the metallic connector leads provide for heat dissipation from the LED string. An insulative sleeve (not shown) may be disposed over the connector leads.

Though a particular pattern of connector leads is shown in FIG. 4, it will be appreciated that the pattern and number of connector leads may be varied according to application requirements. For example, it is not necessary that the leads alternate between positive and negative or have the same size. A single positive connector lead and a single negative connector lead could be printed in a pattern that provides alternating locations for making positive and negative connections. However, it is desirable to have sufficient metal in the connector leads in order to provide sufficient heat dissipation from the LED string.

Figure 5:
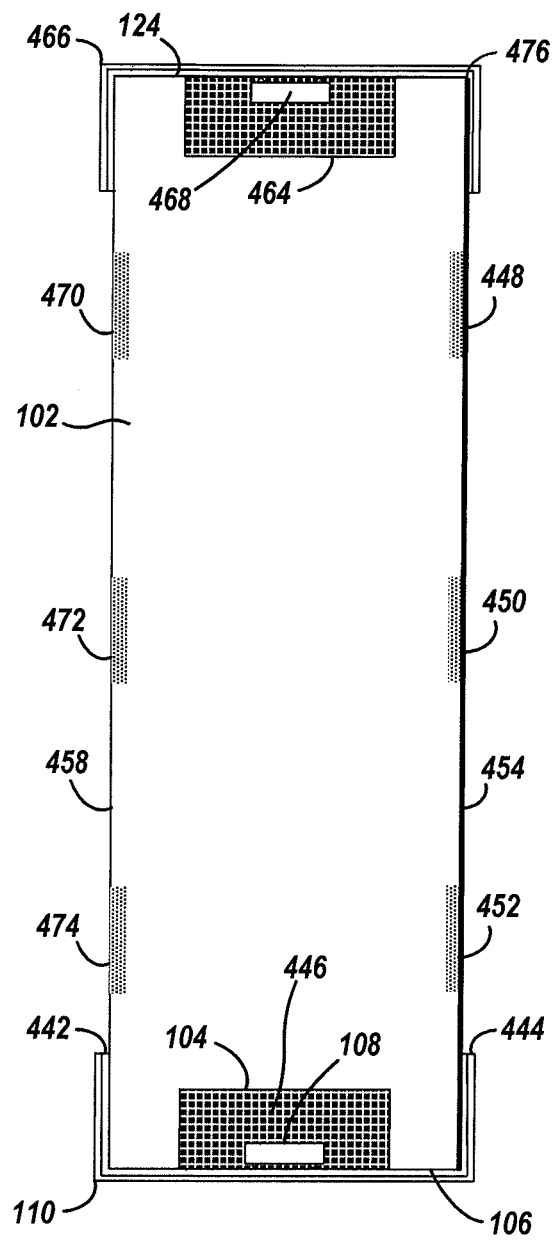
FIG. 5 shows a cross-sectional view of the lighting apparatus of FIG. 1 taken in the direction of cross-section lines 5.

FIG. 5 shows a cross-sectional view of the lighting apparatus of FIG. 1 taken in the direction of cross-section lines 5. The cross-sectional view shows light-diffusive plate 102 in which channel 104 is covered by channel cover 110. In the example implementation, the channel cover is an aluminum-coated polyimide, which is illustrated with polyimide layer 442 and metal coating 444.

LED 108 is mounted on the polyimide layer 442 and connected to conductive traces (not shown) that are either on the surface of the polyimide layer or in a layer of conductive traces in a multilayer arrangement. Because the channel cover is metal coated, the metal coating 444 provides an effective heat sink for dissipating heat generated by the LEDs. This may simplify the support structure needed for the lighting apparatus and make the lighting apparatus suitable for a variety of applications.

In an example implementation, the channel 104 is filled with an ultra-violet (UV) curable encapsulant 446. In one implementation, the encapsulant serves to secure the channel cover 110 to the light-diffusive plate 102 as well as to seal the components of the lighting apparatus from weather elements for outdoor applications. The encapsulant should be transparent and non-yellowing. In another implementation, a separate weather-tight adhesive may be used to secure the channel cover to the light-diffusive plate.

For many signage applications, emission of an even level of light from the entire surface of the light-diffusive plate may be desirable. Different patterns of disruptions on light-diffusive plates have been used to different effect. One pattern that has been found to be particularly useful is an edge-to-edge pattern of disruptions formed on the surface of the plate. Disruptions 448, 450, and 452 are examples of the disruptions on surface 454 of the light-diffusive plate 102. The disruptions may be laser etched as is known in the art. For applications in which multiple ones of the light-diffusive plates are disposed side by side, the pitch between the disruptions on two separate plates is equal to the pitch between disruptions on the same plate. In another implementation, disruptions 470, 472, and 474 may be formed on surface 458 as well as on surface 454.

In another implementation, a reflector plate 476 may be attached to the surface of the light-diffusive plate having the disruptions.

Figure 6:
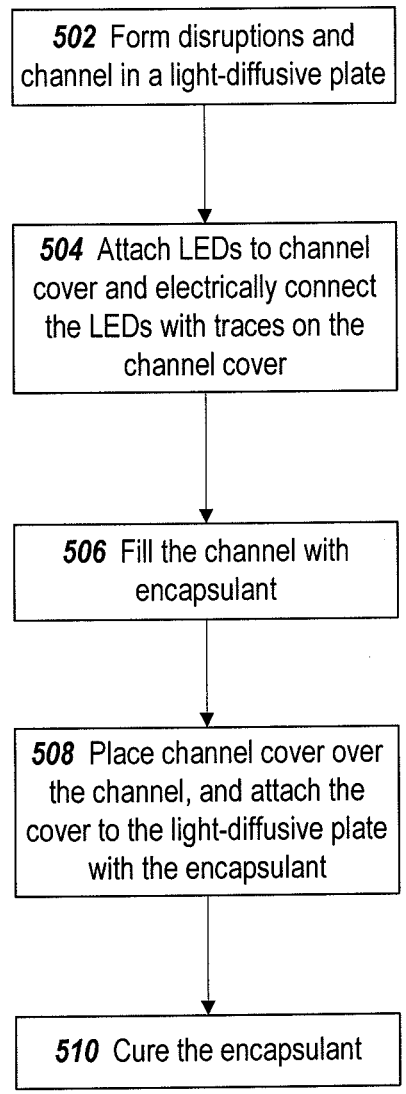
FIG. 6 is a flowchart of a process for constructing a lighting apparatus.

FIG. 6 is a flowchart of an example process for making a lighting apparatus. At block 502, disruptions and a channel are formed in a light-diffusive plate. The disruptions may be formed on a surface of the light-diffusive plate using laser etching as is known in the art. The channel may be formed by laser ablation.

At block 504, a string of LEDs is attached to a channel cover. As explained above, in one implementation the channel cover is a flexible substrate, such as a polyimide, and the substrate is aluminum-coated. In other embodiments, the substrate may be a polyimide substrate that is not metal coated, but has connector leads for providing electrical connections to the LEDs and for dissipating heat from the LEDs. The LEDs may be attached to the substrate and connected to metal traces using techniques known in the art.

The channel in the light-diffusive plate is filled with an encapsulant at block 506. The encapsulant may be transparent and UV-curable. At block 508, the cover is placed over the channel such that the string of LEDs is disposed in the channel. The encapsulant in the channel is cured at block 510 with a UV light source.

Though aspects and features may in some cases be described in individual figures, it will be appreciated that features from one figure can be combined with features of another figure even though the combination is not explicitly shown or explicitly described as a combination.

The present invention is thought to be applicable to a variety of lighting applications. Other aspects and embodiments will be apparent to those skilled in the art from consideration of the specification and practice disclosed herein. It is intended that the disclosed apparatus and method be considered as examples only, with a true scope of the invention being indicated by the following claims.

What is claimed is:

1. A lighting apparatus, comprising:
   a light-diffusive plate having opposing first and second faces bounded by one or more sides, the light-diffusive plate having a plurality of disruptions on the first face and a first channel in at least a portion of a first side of the one or more sides and between the first and second faces of the light-diffusive plate;
   a first cover having first and second surfaces and disposed over the first channel with the first surface facing the first side of the light-diffusive plate; and
   a plurality of light-emitting diodes (LEDs) disposed on the first surface of the first cover and within the first channel, the LEDs electrically coupled with wiring integrated with the first cover, wherein light emitted from the LEDs and directed at the side having the first channel is transmitted within the light-diffusive plate by total internal reflection and scattered by the plurality of disruptions.

2. The lighting apparatus of claim 1, wherein the first surface of the first cover is a circuit-side surface of a dielectric substrate and faces the first channel, and the second surface of the first cover is a metal coating on an opposite surface of the dielectric substrate and faces away from the first channel.

3. The lighting apparatus of claim 2, wherein the dielectric substrate is a polyimide substrate.

4. The lighting apparatus of claim 2, wherein the metal coating is aluminum.

5. The lighting apparatus of claim 1, wherein the first surface of the first cover is a surface of a dielectric substrate, and further comprising:
   at least one positive connector lead and at least one negative connector lead disposed on the second surface of the first cover.

6. The lighting apparatus of claim 1, wherein the first surface of the first cover is a surface of a dielectric substrate, and further comprising:
   a plurality of positive connector leads and a plurality of negative connector leads disposed on the second surface of the first cover.

7. The lighting apparatus of claim 1, wherein the first surface of the first cover is a surface of a dielectric substrate, and further comprising:
   a plurality of positive connector leads and a plurality of negative connector leads disposed on the second surface of the first cover; and
   wherein the positive connector leads and negative connector leads are disposed in an alternating pattern.

8. The lighting apparatus of claim 1, further comprising an ultra-violet (UV) curable encapsulant that fills the first channel.

9. The lighting apparatus of claim 1, further comprising:
   a second channel in at least a portion of a second side of the one or more sides of the light-diffusive plate and between the first and second faces of the light-diffusive plate;
   a second cover having first and second surfaces and disposed over the second channel with the first surface facing the first side of the light-diffusive plate; and
   a plurality of LEDs disposed on the first surface of the second cover and within the second channel, the LEDs electrically coupled with wiring integrated with the second cover.

10. The lighting apparatus of claim 1, further comprising a reflector disposed on the first face of the light-diffusive plate having the disruptions.

11. The lighting apparatus of claim 1, wherein the first cover has a breadth that covers the first channel.

12. The lighting apparatus of claim 11, further comprising an ultra-violet (UV) curable encapsulant that fills the first channel.

13. The lighting apparatus of claim 12, wherein the encapsulant secures the first cover to the light-diffusive plate.

14. The lighting apparatus of claim 1, wherein the light-diffusive plate further includes a plurality of disruptions on the second face of the opposing faces.

15. A method of making a lighting apparatus, comprising:
forming disruptions on a first face of opposing first and second faces of a light-diffusive plate, the opposing first and second faces of the light-diffusive plate bounded by one or more sides;
forming a first channel in at least a portion of a first side of the one or more sides and between the first and second faces of the light-diffusive plate;
attaching a plurality of light-emitting diodes (LEDs) on a first surface of a first cover; and
attaching the first cover to the light-diffusive plate over the first channel such that the plurality of LEDs are disposed in the first channel and light emitted from the LEDs and directed at the side having the first channel is transmitted within the light-diffusive plate by total internal reflection and scattered by the disruptions.

16. The method of claim 15, further comprising:
filling the first channel with an ultra-violet (UV) curable encapsulant; and
curing the encapsulant in the first channel.

17. The method of claim 16, wherein the attaching the first cover to the light-diffusive plate over the first channel includes securing the first cover to the light-diffusive plate with the encapsulant.

18. The method of claim 15, wherein the attaching of the plurality of LEDs to the first cover includes attaching the plurality of LEDs to a first surface of the first cover that faces the first channel, the first cover having integrated wiring electrically coupling the plurality of LEDs and a second surface that is metal-coated and faces away from the first channel.

19. The method of claim 15, further comprising:
forming a second channel in at least a portion of a second side of the one or more sides of the light-diffusive plate and between the first and second faces of the light-diffusive plate;
attaching a plurality of LEDs on a first surface of a second cover; and
attaching the second cover to the light-diffusive plate over the second channel such that the plurality of LEDs are disposed in the second channel.

20. The method of claim 15, wherein the attaching of the plurality of LEDs to the first cover includes attaching the plurality of LEDs to a first surface of the first cover, the first cover having a plurality of positive connector leads and a plurality of negative connector leads disposed on a second surface of the first cover.

21. A lighting apparatus, comprising:
a light-diffusive plate having opposing first and second faces bounded by one or more sides, the light-diffusive plate having disruptions on the first face and a first channel in at least a portion of a first side of the one or more sides and between the first and second faces of the light-diffusive plate;
a first cover including a polyimide substrate, the polyimide substrate having a first surface and a second surface, and the first cover disposed over the first channel with the first surface of the polyimide substrate facing the first side of the light-diffusive plate;
a plurality of light-emitting diodes (LEDs) disposed on the first surface of the polyimide substrate and within the first channel, the LEDs electrically coupled with wiring integrated with the polyimide substrate, wherein light emitted from the LEDs and directed at the side having the first channel is transmitted within the light-diffusive plate by total internal reflection and scattered by the disruptions;
at least one positive connector lead and at least one negative connector lead disposed on the second surface of the polyimide substrate, the at least one positive connector lead electrically coupled to a positive power line of the LEDs and the at least one negative connector lead electrically coupled to a negative power line of the LEDs; and
an ultra-violet (UV) curable encapsulant that fills the first channel.

22. The lighting apparatus of claim 21, wherein the at least one positive connector lead and the at least one negative connector lead include a plurality of positive and negative connector leads disposed in an alternating pattern.

23. The lighting apparatus of claim 21, further comprising:
a second channel in at least a portion of a second side of the one or more sides of the light-diffusive plate and between the first and second faces of the light-diffusive plate;
a second cover including a polyimide substrate, the polyimide substrate having a first surface and a second surface, and the second cover disposed over the second channel with the first surface of the polyimide substrate facing the second side of the light-diffusive plate;
a plurality of LEDs disposed on the first surface of the polyimide substrate of the second cover and within the second channel, the LEDs electrically coupled with wiring integrated with the polyimide substrate of the second cover; and
an ultra-violet (UV) curable encapsulant that fills the second channel.

24. The lighting apparatus of claim 21, wherein the light-diffusive plate further includes a plurality of disruptions on the second face of the opposing faces.

* * * * *